United States Patent [19] [11] 3,999,569
Lindner et al. [45] Dec. 28, 1976

[54] IRRIGATION SPRINKLING APPARATUS WITH ADJUSTABLE GROUND CONTACTING ELEMENTS

[75] Inventors: Herbert E. Lindner; Jack E. Mertaugh, both of Lubbock, Tex.

[73] Assignee: Gifford-Hill & Company, Inc., Spokane, Wash.

[22] Filed: Oct. 16, 1975

[21] Appl. No.: 622,969

[52] U.S. Cl. .............................. 137/344; 239/177
[51] Int. Cl.² ...................................... B05B 3/00
[58] Field of Search ........... 239/177, 212; 137/344

[56] References Cited

UNITED STATES PATENTS

| 3,230,969 | 1/1966 | Purtell | 137/344 X |
| 3,361,360 | 1/1968 | Purtell | 137/344 X |
| 3,583,639 | 6/1971 | Cornelius | 137/344 X |
| 3,926,372 | 12/1975 | Johnson | 137/344 X |

Primary Examiner—Alan Cohan
Assistant Examiner—Gerald A. Michalsky
Attorney, Agent, or Firm—Bard, Springs & Jackson

[57] ABSTRACT

Irrigation sprinkling apparatus according to the present invention may include structural means for supporting at least a portion of a mobile sprinkling apparatus that is adapted in use for rotation about a fixed point for irrigating a generally circular ground area. Each of the mobile base structures for the irrigation apparatus will include ground contacting elements such as wheels, tracks or other devices that serve to propel the respective mobile base over the land area during irrigation operations. Each of the ground contacting elements is supported for rotation relative to the respective portion of the mobile base to which it is connected and is positionable in an operating position that substantially establishes an arcuate track about said fixed point during irrigation operations and is rotatable substantially 90° from said operating position for allowing substantially linear movement of said irrigation sprinkling apparatus. Adjustment means is provided, allowing each of the ground contacting elements of each of the mobile bases to be adjusted relative to the respective mobile base so as to establish precise tracking of a circular arc about the fixed point of rotation.

8 Claims, 6 Drawing Figures

IRRIGATION SPRINKLING APPARATUS WITH ADJUSTABLE GROUND CONTACTING ELEMENTS

FIELD OF THE INVENTION

This invention is related generally to irrigation sprinkling apparatus and more particularly to irrigation apparatus that is adapted for rotation about a fixed point for irrigation of large generally circular land areas. Specifically, the present invention is directed to means for establishing positioning between the ground contacting elements of the irrigation apparatus and the respective mobile bases of the irrigation apparatus so as to allow the ground contacting elements to be positioned either in an operative position during irrigation operations or in a linear movement position, allowing the irrigation apparatus to be moved linearly to other locations in erected condition. Even more specifically, the present invention is directed to means for providing precise adjustment between the ground contacting elements of the irrigation apparatus and the respective mobile bases thereof in order to allow the ground contacting elements, such as wheels, for example, to precisely track an arc about the pivot point of the irrigation apparatus during irrigation operations.

BACKGROUND OF THE INVENTION

Of the various types of irrigation equipment that has been utilized for extensive periods of time, mobile irrigation systems that rotate about a central point or water supply tower for the purpose of irrigating large generally circular land areas are well known in the art as indicated by U.S. Pat. No. 3,314,608 to Curtis et al. Generally there is provided a centrally located tower that serves as a pivot for the rotatable irrigation apparatus and also serves to supply water to the irrigation apparatus through a conventional swivel connection. The irrigation apparatus will generally comprise a plurality of spans, each span being supported by one or more mobile support structures that travel over the land area. Each of the mobile support devices typically comprises a framework of generally triangular nature with the water supply pipe of the irrigation system being supported by the framework. The framework also typically defines an elongated base typically having a pair of ground contacting elements such as wheels, tracks, etc. that are supported at each extremity of the base in order to provide both mobile support and stability for the framework defining the mobile base. While it is intended that the present invention be of sufficient breadth to include all manner of ground engaging motive devices such as wheels, tracks, etc., for purposes of simplicity the ground engaging elements will be referred to as "wheels".

Since overhead mobile irrigation systems of this nature are very expensive and since it may be desirable to move the irrigation system to other land areas in order to increase the amount of land area that is under irrigation and therefore render the irrigation process more commercially feasible, it is considered desirable to provide each of the mobile bases of such irrigation systems with wheels or other ground contacting elements that are rotatable from an operative position, where they are disposed substantially normal to the direction of the water supply pipe of each of the spans, to a system movement or towing positing where the wheels or ground contacting elements are disposed in substantially parallel relationship to the water supply pipe. In order to accomplish such movement, each of the wheels must be rotatable through an arc of substantially 90°. It is also well known in the art to provide for simple 90° rotation of ground engaging wheels and other drive elements as shown in U.S. Pat. No. 3,662,776 to Bryant et al, which shows a bolting arrangement allowing the drive unit supporting the wheel to be swung relative to the support frame to position the wheels axis substantially parallel to the conduit or at a substantial angle relative thereto. The bolts provide for locking of the drive unit in either position. Likewise U.S. Pat. No. 3,771,719 to Raso et al teaches the provision of a drive and gear module that is provided with a quick disconnecting device in order to permit wheel rotation for towing.

Where the drive wheels are disposed in substantially parallel relation with the elongated mobile base to which they are connected during irrigation operations, which is typically the case, the wheels are disposed in offset relation to a center line of the irrigation system that extends from the pivot of each of the spans centrally through the mobile support structure at the extremity of each of the spans. In essence, each of the ground contacting wheels are disposed in tangential relation to an arc defined by the intersection of the imaginary centerline of the irrigation system with the mobile base. There is a tendency for the ground engaging wheels to roll in a straight line over the land area, but the force on each of the spans of the irrigation system caused by the restraining presence of the pivot tower and water supply system causes the ground engaging wheels to be forced sideways or scrubbed along the ground surface. This sidewise movement or scrubbing effect greatly accelerates wear on the ground engaging wheels and severely detracts from the useful operating life thereof. Where the ground engaging wheels are defined by rubber tires, the tire treads will be caused to wear quite rapidly by the scrubbing effect thereof with the land surface. Where the ground engaging elements are defined by devices other than tires, such as tracks, metal wheels, etc., there is considerable stress induced by the nature of the contact of the ground engaging elements with the land surface which stress has a damaging effect both on the ground contacting elements and the drive systems connected thereto and to the irrigation system itself. It is desirable therefore to provide means for causing the wheels or ground contacting elements of the irrigation system to precisely track a circular course in order to eliminate any scrubbing or dragging effect thereof as a circular course is circumscribed during irrigation operations.

It is therefore a primary feature of the present invention to provide a novel mobile base construction for overhead irrigation apparatus adapted for circular movement about a centrally located point, wherein each of the various wheels or ground contacting elements of the mobile base is precisely oriented so as to circumscribe a circular track as the irrigation system is rotated regardless of the particular distance of wheel location from the central point of rotation of the irrigation system.

It is a further feature of the present invention to provide a novel mobile base construction for irrigation systems that are rotatable about a centrally located point, wherein each of the wheels or ground contacting elements of the irrigation system are disposed in offset relation with respect to the center line of the irrigation system and yet are oriented in such manner as to track a precise circle during irrigation operations.

Among the several objects of the present invention is contemplated the provision of a novel mobile base construction for irrigation systems that are rotatable about a centrally located point, wherein each of the wheels or ground contacting elements of the irrigation system may be simply and efficiently positioned either at an operative position where the ground engaging wheels or elements subscribe a circular arc or a movement position where the wheels or ground contacting elements are disposed in substantially parallel relation with the elongated axis of the irrigation system to facilitate linear movement thereof from place to place.

It is also a feature of the present invention to provide a novel mobile base construction for overhead irrigation systems of the circular movement type, whereby means is employed to positively establish the operative and movement positions of the wheels or ground contacting elements so as to simplify repositioning of the wheels or ground contacting elements following either operation or movement of the irrigation system.

It is among the several objects of the present invention to provide a novel overhead irrigation system adapted for rotary movement, whereby a single position controlling element may be utilized for establishing positioning of the wheels or ground contacting elements either in the operative or movement positions thereof.

It is an even further feature of the present invention to provide a novel overhead irrigation system adapted for rotary movement, whereby a single type of position adjustment device may be employed to establish positioning of all of the various wheels or ground contacting elements of the irrigation system, there being provided simple means for wheel adjustment in order to precisely establish the various operative and movement positions of the various wheels of the irrigation system as desired.

It is another object of the present invention to provide a position controlling mechanism for the ground contacting elements of a traveling irrigation sprinkling system wherein the ground contacting elements will become repositioned at the proper adjusted operating position thereof immediately upon being moved from a towing position to the operating position thereof.

Other and further objects, advantages and features of the present invention will become apparent to one skilled in the art upon consideration of this entire disclosure. The form of the invention, which will now be described in detail, illustrates the general principles of the invention, but it is to be understood that this detailed description is not to be taken as limiting the scope of the present invention. For example, although the present invention is described pricipally as it relates to utilization in conjunction with irrigation systems that are adapted for circular movement about a central point for irrigation of large generally circular land areas, it is not intended in any way to limit the present invention to this particular type of irrigation system. Wheel adjustment devices may be provided for use in connection with irrigation systems of other types if controllable wheel adjustment is appropriate.

SUMMARY OF THE INVENTION

In accordance with the present invention, conventional irrigation systems may be equipped with position adjustment mechanisms for the ground engaging wheels, tracks or other devices which allow the ground engaging elements to be precisely adjusted in order to circumscribe a precise arc as the irrigation system is rotated about a common point or to provide an accurate track as the irrigation system is moved from place to place. Although the present invention is discussed herein particularly as it applies to the provision of wheel adjustment for irrigation systems that are adapted for circular movement about a central point, it is to be understood that other types of movable irrigation systems may also be provided with wheel adjustment devices in accordance with the present invention without departing from the spirit or scope thereof. Each of the various mobile bases that are utilized for supporting the irrigation pipe and its supporting truss, typically known as a span, typically define an elongated base element that is disposed in generally transverse or normal relation to the elongated axis of the irrigation system. Two or more ground contacting elements, which are discussed herein as ground engaging wheels, but which may conveniently take the form of endless track mchanisms or any other suitable ground engaging elements, may also be employed within the scope of the present invention. It is typical for two wheels to be located, one at each extremity of the elongated base element, giving the pipe or span supporting tower structure inherent stability on the land surface being irrigated.

In accordance with the present invention the wheels will be mounted to the horizontal base element by means of generally vertically oriented pivots that are connected to the base element adjacent each extremity thereof. The wheel support structure will include a structural plate to which may be bolted or otherwise secured a drive gear or other drive mechanism having an axle extending therefrom, the axle supporting a wheel that is adapted to roll over the surface being irrigated. The wheel itself may be constructed of metal or in the alternative may employ a rim structure having an air inflated tire carried thereby. The tire will be typically provided with treads in order to enhance a gripping relationship between the tire and the surface being irrigated in order to cause the irrigation system to be driven as the tires are rotated by the gear mechanism. A single motor such as an electric, hydraulic or pneumatic motor may be employed to impart rotation to each of the drive wheels through an appropriate transmission and gear train system if so desired. In the alternative, each of the mechanisms carried by the wheel support structure may comprise a motor that drives an individual wheel, whereby direct drive is established between each of the motors and the respective wheels.

It will be desirable to position the wheels in an operative position, where each of the wheels will track a perfect circle about the point about which the irrigation system rotates and a movement or towing position, where each of the various wheels of the irrigation system is disposed substantially parallel to the elongated axis of each of the pipe sections or spans of the irrigation system. The movement or towing position of the wheels allows substantially linear movement of the entire irrigation system as it is moved or towed in erected condition from place to place to promote use of a single irrigation system for irrigation of multiple land areas.

A reference and support structure may be fixed to the horizontal base element and may be provided with connection means to establish connection with an elongated adjustment element that may also establish connection with a bracket that is fixed to the rotatable wheel support structure. The elongated adjustment element may be adjusted as desired to establish rotatable positioning of the bracket of the rotatable wheel support element, thereby establishing positive angular orientation of the wheel support element and wheel relative to the elongated horizontal base element. This adjustment causes the wheel to track a desirable circle about the pivot point of the irrigation apparatus. Each of the ground engaging wheels of each of the mobile base pipe support towers of the irrigation system may be adjusted separately so as to establish precise circular tracking of each of the wheel structures.

The reference and support structure may also incorporate separate reference and support means that may receive the elongated adjustment element after the wheel support structure, with the wheel drive mechanism and wheel structure attached thereto, have been pivoted substantially 90°, promoting adjustable positioning of the wheel or other ground contacting element in precisely oriented relationship with the elongated axis of the irrigation system so as to promote efficient movement of the irrigation system to other locations. Lock elements provided on the reference and support structure effectuate simple and accurate repositioning of the ground contacting elements at the properly adjusted position thereof when the ground contacting elements are moved from the towing position to the operating position thereof.

There may be provided indicia on the wheel support structure that may be oriented with respect to an orientation point or line on the elongated base element, allowing simple and efficient adjustment of the wheel structure as may be necessary or appropriate to achieve desirable functions.

BRIEF DESCRIPTION OF THE DRAWINGS

So that the manner in which the above recited features, advantages and objects of the present invention as well as others which will become apparent are attained and can be understood in detail, more particular description of the invention, briefly summarized above, may be had by reference to the embodiments thereof which are illustrated in the appended drawings, which drawings form a part of this specification.
In the Drawings.

The present invention, both as to its organization and manner of operation may best be understood by way of illustration and example of certain preferred embodiments when taken in conjunction with the accompanying drawings in which.

DETAILED DESCRIPTION OF PREFERRED EMBODIMENT

Figure 1:
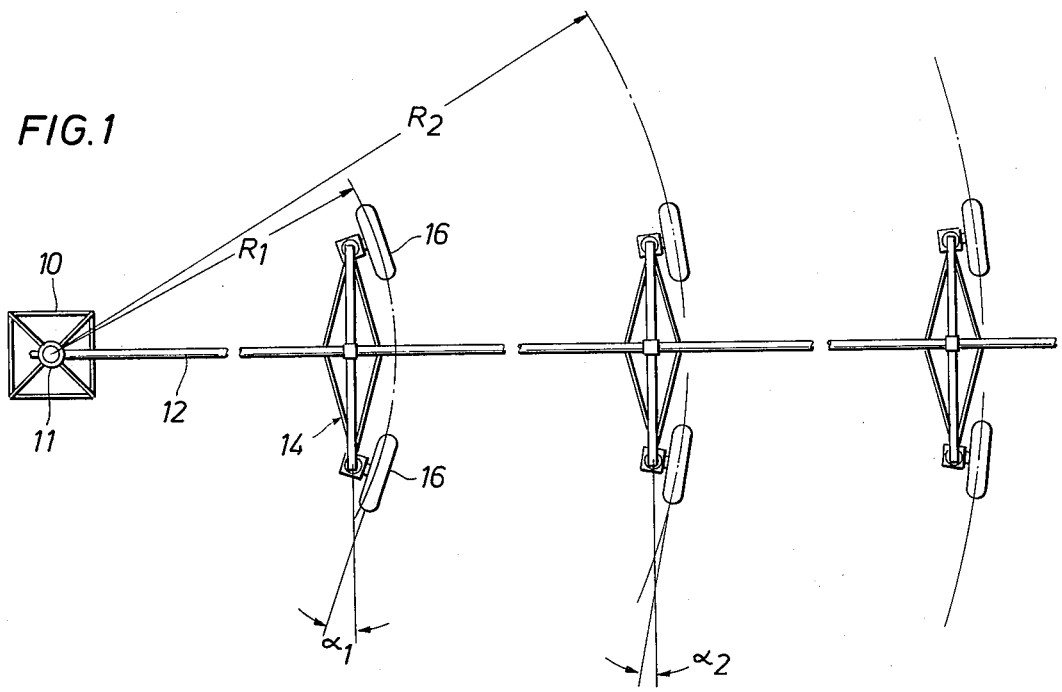
FIG. 1 is a plan view of an irrigation system of the circular movement type with wheels or other ground engaging elements being supported by wheel support structure constructed in accordance with the present invention, the wheel support structure being positioned to facilitate accurate tracking of a circular path as the irrigation system is operated during irrigation operations.

With reference now to the drawings and first to FIG. 1, there is depicted in diagrammatic form a portion of an irrigation system constructed in accordance with the present invention, which system is adapted for rotation about a central point. Although only three ground contacting mobile bases are shown to be provided for support of the overhead pipe or spans of the irrigation system, it is not intended that the present invention be limited to any particular number of pipe or span supporting structures. It is typical in the industry for circular type irrigation systems to have a length of one quarter mile or so and to have as many as ten or more pipe or span supporting mobile devices which shall be referred to hereafter as mobile bases. The irrigation system is therefore capable of irrigating a generally circular area having a diameter of one-half mile or so.

As shown in FIG. 1, there may be provided a centrally located tower 10 that is firmly anchored to the earth and which may also incorporate water supply structure that transports water to a swivel connection 11 located at the upper portion of the tower. An irrigation pipe or conduit 12 will be connected to the rotatable water supply swivel in any desirable manner, thereby allowing the pipe or conduit 12 to rotate about the tower 10. At the opposite extremity of the conduit 12 may be disposed a mobile base structure shown generally at 14 having ground engaging wheels 16 that cause the mobile base, and thus the water supply conduit 12 supported thereby, to be moved. Other similar mobile bases and water supply conduit sections may be connected in end-to-end relation with each of the sections being supported at the far extremity thereof by a mobile base structure. Although for purposes of simplicity the conduit 12 is shown simple as a pair of lines denoting a conduit, it is to be understood that each of the sections or spans of the irrigation system will incorporate, in addition to a water supply pipe or conduit, a truss structure that supports the length of water supply pipe extending between the respective mobile bases. Such truss systems are well known in the art.

As shown in FIG. 1, each of the mobile bases includes a pair of ground contacting wheels 16. Heretofore, such ground contacting wheels were oriented in substantially parallel relation to the direction or line established by the mobile base. The axle supporting the ground contacting wheel is typically oriented in normal relation to the elongated mobile base structure. As each of the mobile base assemblies is driven, causing rotation of the pipe span 12 and its pipe supporting truss structure, there will be a tendency for the ground contacting wheels to follow or track a straight line, but this tendency will be overcome by the restraining force provided by the centrally located tower structure 10. This causes the ground engaging wheels to be in effect dragged sidewise on the surface being irrigated in order to force the wheels to leave their linear track and assume a circular track. Dragging and/or scuffing of the wheels in this manner obviously causes the ground engaging wheels to have accelerated wear and causes tire or wheel replacement costs to be quite high. The present invention effectively eliminates scraping or scuffing of the ground engaging wheels and thereby promotes efficient utilization of the wheel structures in addition to retarding the wear that might otherwise occur. A primary feature of the present invention involves means for establishing accurate angular positioning of the ground contacting wheels relative to the respective mobile bases, said angular positioning $\alpha 1$ and $\alpha 2$ being controlled by the distance $R1$ and $R2$, etc. of the various mobile bases from the pivot point established by the swivel pivot 11.

Figure 2:
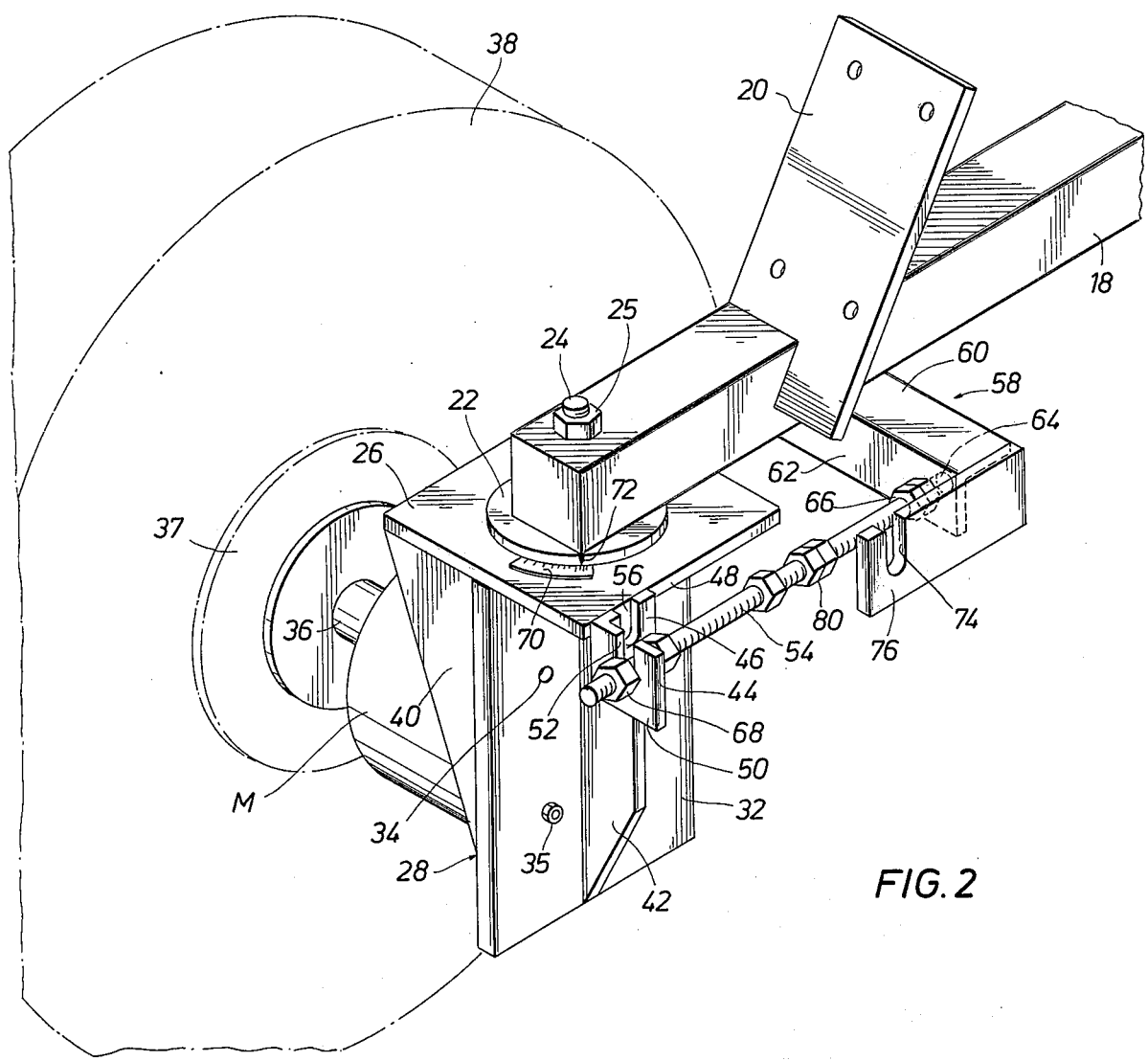
FIG. 2 is a fragmentary isometric view depicting a portion of one of the pipe or span support structures of the irrigation system with a rotatable and controllably positioned wheel and wheel drive support structure pivotally connected thereto and being retained in a position that will orient a ground engaging wheel in the operative position thereof.

Referring now to FIG. 2, each of the mobile base assemblies illustrated generally at 14 may include an elongated base element 18 that is typically constructed of steel and may be 20 feet or so in length and which is typically disposed in substantially horizontal relation to the surface being irrigated. The particular configuration of the structural elements partially illustrated in FIG. 2 is not to be considered limiting of the scope of the invention because such design has little bearing on the primary function of the base assemblies which is to cause spacing of the ground engaging elements sufficiently to achieve stability of the mobile base structure. Connector braces 20 may be secured to the elongated base element 18 by welding or the like, the braces 20 being disposed in inclined relation to the elongated base element so as to properly orient other structural elements of the mobile base to define a mobile base structure of generally triangular configuration. The pipe and pipe supporting spans will typically be located at the apex of the generally triangular mobile base structure.

For purposes of simplicity the wheel support and orienting structure of the mobile base mechanism will be discussed only in relation to a single wheel positioning and adjustment mechanism, it being obvious that another similar mechanism would be disposed at the opposite extremity of the elongated mobile base assembly in order to provide for adjustable positioning of the other of the two ground engaging wheels of the mobile base mechanism. A wear plate 22 may be welded or otherwise affixed to the lower portion of the elongated base element 18 and may have a centrally located aperture formed therein that is disposed in registry with vertically oriented apertures defined in the elongated base element, which apertures correspond to receive a pivot bolt 24 having the lower extremity thereof received by a generally horizontally disposed support plate 26 provided on a wheel support and positioning element illustrated generally at 28. The structural integrity of the connection between the wear plate 22 and the elongated base element 18 is enhanced by a small triangular gusset element 30 shown in FIGS. 3–6 that is welded or otherwise secured to both the wear plate 22 and one side wall of the elongated base element 18.

Figure 4:
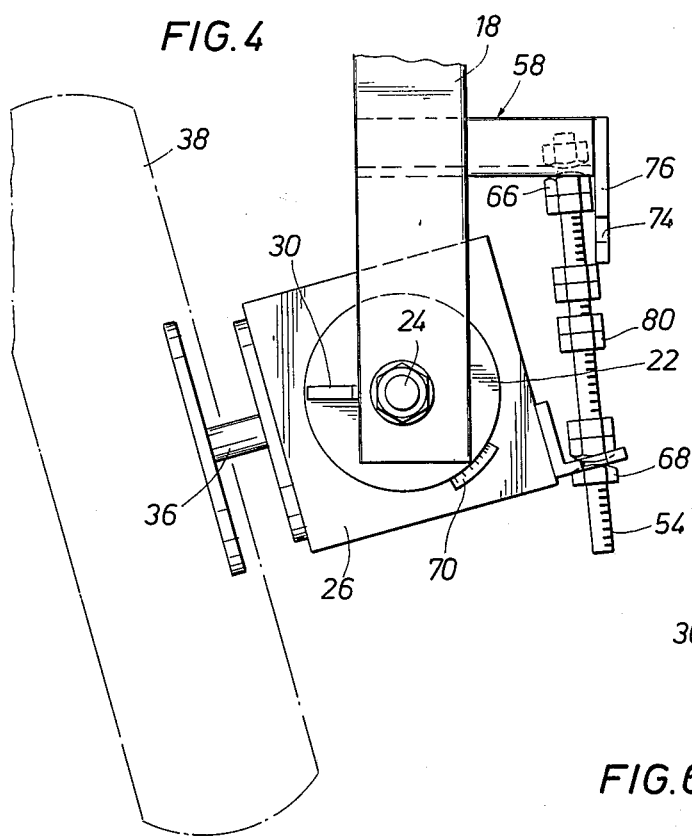
FIG. 4 is a fragmentary plan view of a portion of the pipe or span supporting structure of the irrigation system of FIG. 1 illustrating maintenance of the ground engaging wheel in an adjusted operative position thereof as exists during irrigation operations.
Figure 6:
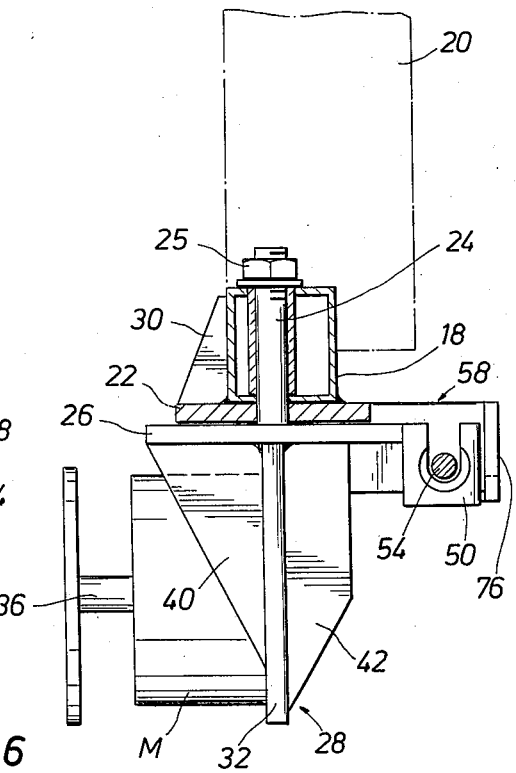
FIG. 6 is an elevational view of a portion of a pipe or span support structure of the irrigation system with a portion of the elongated structural element broken away and shown in section, depicting the pivot structure thereof in detail.

The wheel support and positioning element may include a wheel support plate 32 that may be oriented in generally vertical manner with the upper extremity of the plate 32 being welded or otherwise secured to the lower surface of the support plate 26. A plurality of apertures 34 may be formed in the wheel support plate and bolts or other suitable devices 35 may extend through the apertures in order to connect a wheel drive gear mechanism to the support plate 32. The wheel drive mechanism of the mobile base structure, which does not form a part of the present invention, may be driven by a motor M through a drive shaft and universal joint assembly to impart rotation to an axle 36 that extends therefrom as shown in FIG. 4. A wheel hub 37 may be received by the axle 36 and may support a pneumatic tire 38 that establishes ground engagement for the mobile base structure. One or more gussets 40 may be welded or otherwise fixed to both the wheel support plate 32 and the upper support plate 26 in order to enhance the structural integrity of the wheel support and positioning element 28. The structural integrity of the wheel support and positioning element may be further enhanced by a flange structure 42 that is disposed in substantially normal relation both to the wheel support plate 32 and the support plate 26 with connection between the flange 42 and the plates 26 and 32 being established by welding or by any other suitable means of connection.

The pivotal connection between the wheel support and positioning element 28 and the elongated base element 18, which is maintained solely by retaining the pin 24 in position by means of a lock nut 25, allows the wheel support and positioning element to be free for rotation relative to the elongated base element. It is necessary therefore to provide means for positively securing the wheel support and positioning element in releasably and adjustably fixed relationship relative to the elongated base element. In accordance with the present invention, means for establishing static positioning of the wheel support and positioning element may include a positioning bracket 44 that is of generally L-shaped configuration providing one portion 46 that may be welded or otherwise fixed to an edge surface 48 of the support plate 26. The positioning bracket 44 presents an arm 50 that extends from the support plate and is formed to define a generally U-shaped slot 52 within which may be received an elongated adjustment element 54 in a manner shown in FIG. 2. The positioning bracket 44 may also be formed to define an additional slot 56 that may also be of generally U-shaped configuration and does not serve a function when utilized as shown in FIG. 2. When the positioning bracket 44 is utilized for connection to the support plate at the opposite extremity of the elongated base element 18 the bracket will be reversed, causing portion 46 of the bracket to extend from the support plate 26 and causing the slot 56 to receive a similar elongated adjustment element such as that shown at 54. This feature enables a single bracket design to be utilized on the wheel support and positioning elements of both of the wheel structures provided for the mobile base construction, thereby simplifying the inventory of parts that are required for the manufacture of each of the wheel support and positioning elements of the various mobile base devices.

A reference and support member shown generally at 58, which may conveniently take the form of an angle type structural element, may be secured to the elongated base element 18 by welding or the like in such manner that an upper flange 60 thereof is disposed in substantially parallel relation with the lower portion of the elongated base element while a depending flange 62 thereof may be disposed in substantially normal relation both with the lower portion and side walls of the elongated base element. The depending flange 62 may be formed to define an aperture 64, shown in broken line through which may extend the elongated adjustment element 54 with substantially immovable connection between the elongated structural element and the depending flange 62 being established by lock nut means 66 that are received by a threaded portion of the elongated adjustment element. If desired the elongated adjustment element 54 may conveniently take the form of a completely threaded rod that is adapted to receive a plurality of nuts for securing the adjustment rod in certain desirable positions relative to the bracket 44 and the reference and support member 58. Double lock nuts are utilized that may be friction locked together to provide a positive stop that serves to locate the towing and operating positions of the mechanism. Thus, by simply positioning the elongated adjustment element relative to the fixed and movable portions of the structural framework, the towing and operating positions of the ground contacting element can be quickly and simply determined. By manipulating the lock nut elements, the relative positions of the ground contacting elements can readily be changed as desired.

With lock nuts 66 received by the threaded rod 54 and disposed on either side of the depending flange 62 of the reference and support member 58, the threaded rod or shaft will be disposed in fixed relation to the reference and support member. The wheel support and positioning element then will be rotated to a desirable position bringing the bracket 44 into desired relationship with the elongated threaded adjustment element. Lock nuts 68 received by the elongated threaded element and disposed on either side of the arm portion 50 of the bracket 44 may be utilized to position and lock the bracket structure relative to the threaded adjustment rod. Obviously, adjustment of the wheel support and positioning element may be achieved by loosening one of the lock nuts and by rotating the other lock nut in the direction desirable for causing desired rotation of the wheel support and positioning element about the pivot pin 24.

To facilitate simple and efficient adjustment of the operating position of the various wheels of the various mobile base structures of the irrigation system, suitable indicia such as shown at 70 in FIG. 2 may be affixed to the support plate 26 in any suitable manner and may be utilized in conjunction with a pointer mark defined on the wear plate 22 such as shown at 72 in order to establish appropriate positioning of the respective wheel of the mobile base structure in relation to its particular distance from the centrally located support tower. For example, if the mobile base involved is the third mobile base from the support tower and the spans of the irrigation system are of standard length, accurate positioning of the wheels of that respective mobile base may be achieved simply by aligning the reference mark 72 with the mark on the indicia 70 corresponding to the number 3 achieving the desired angular position of the wheels for efficient tracking. The indicia 70 may conveniently take the form of a decal or a plate that is affixed to the support plate 26 in any suitable manner.

Figure 5:
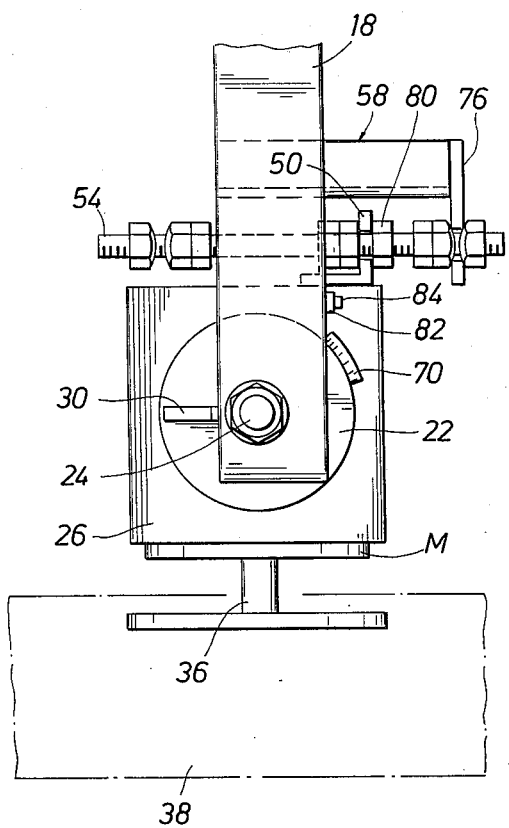
FIG. 5 is a fragmentary plan view of a portion of the pipe or span support structure of the irrigation system, illustrating maintenance of the ground engaging wheel in the movable position thereof as exists when the irrigation system is being moved or towed from one location to another.

It will also be desirable to accomplish rotation of the wheel support and positioning element to a position causing the respective ground engaging wheel to be positioned in substantially normal relation to the direction established by the elongated base element. When in this position, the entire irrigation system may be towed or moved in train-like manner from place to place to facilitate utilization of the irrigation equipment to irrigate other land areas. Transporting the irrigation system in its erected condition is a time saving operation and is therefore quite desirable. Rotation of the wheel support and positioning element may simply be accomplished by loosening appropriate ones of the lock nuts 66 and 68, which disconnects the position controlling bracket 44 from the elongated adjustment element 54 and allows the wheel support and positioning element freedom of rotation. After the wheel support and positioning element 28 has been rotated 90° counterclockwise as shown in FIG. 2, the slot 52 of the position controlling bracket 44 will be positioned in corresponding alignment with a generally U-shaped slot 74 defined in an adjustment arm 76 that extends from one extremity of the reference and support member 58. The arm 76 in fact provides a reference and support structure from which orientation of the positioning bracket 44 may be effectively achieved for both the towing and operating positions of the ground contacting elements. The elongated adjustment element 54 may be removed from its connection with the depending flange 62 of the reference and support member 58 and may be secured by the respective lock nuts 66 or 68 as is appropriate. Intermediate lock nuts 80 and end lock nuts 68 may be utilized for establishing connection between the U-shaped slot 74 of the arm 76 and the slot of the bracket 44. The position controlling mechanism when in this position will be substantially as shown in FIG. 5.

Figure 3:
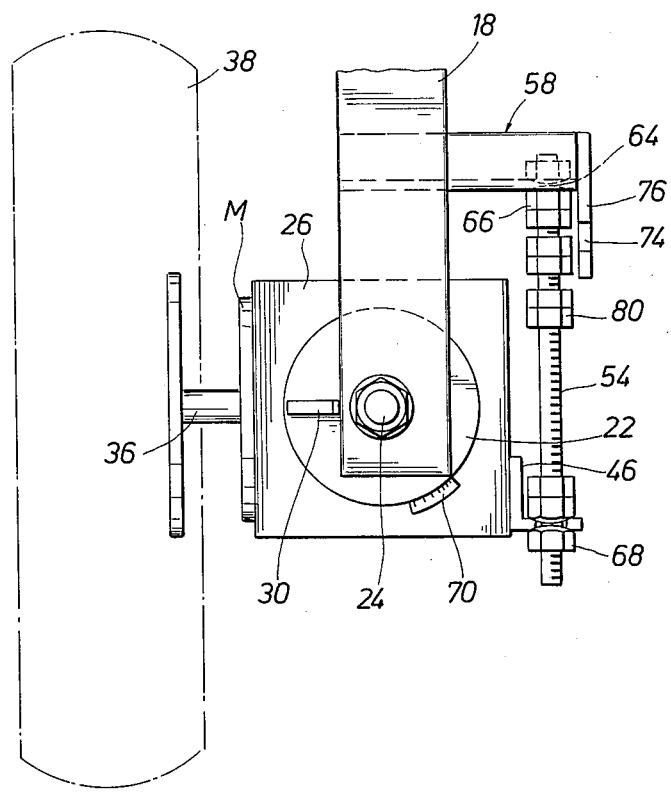
FIG. 3 is a fragmentary plan view of a portion of the pipe or span support structure of the irrigation system of the present invention, illustrating the ground engaging wheel being disposed in substantially normal relation with the water supply pipe of the irrigation system before angular adjustment of the position of the wheels.

When it is desired to adjust the position of a ground contacting wheel relative to the mobile base construction this can be accomplished simply by loosening one of the lock nuts 68, depending upon the particular direction of rotation that is desired and by tightening the opposite one of the lock nuts such as is desirable to impart appropriate rotary movement to the wheel support and positioning element. After the wheel has properly positioned as verified by the relative position of the pointer 72 on the wear plate 22 and the indicia 70, the lock nuts then may be appropriately adjusted to secure the wheel support and positioning element in the desired position to cause accurate tracking of the wheels with respect to the prescribed arc for the particular distance the mobile base structure is located relative to the centrally located support tower. The wheel positions shown in FIGS. 3, 4 and 5, illustrate various angular positioning of the ground engaging wheels carried by the wheel support and positioning element that can be accomplished by controlled adjustment.

It may be desirable to provide controlled adjustment of the positions of the ground engaging wheels only in the operative position of the mobile base structures. When the ground contacting wheels are disposed in the movement or towing position, it may be desirable that they always be disposed in substantially normal relation to the elongated axis of the elongated base element. If this is the case, it may be desirable to provide a stop element such as shown alternatively at 82 in FIG. 5, which stop element may be provided with an aperture through which a bolt 84 extends to lock the stop element 82 against one of the side surfaces of the elongated base element 18. The stop element 82 will not engage the elongated base element when the ground engaging wheel is disposed in the operative position thereof as shown in FIGS. 3 and 4. Utilization of an adjustable retaining mechanism to secure the wheel support and positioning element in the movement or towing position thereof as shown in FIG. 4, effectively allows the wheel structures to be precisely oriented relative to the elongated base element 18 regardless of the particular relationship between the wheel structure and the wheel support and positioning element. Any wear that may have occurred to the wheel and wheel drive mechanism of the irrigation system or to the mobile base structure may be effectively and simply compensated for by means of the adjustable connection structure of the present invention.

In view of the foregoing it is clear that there has been provided a novel mobile base structure for irrigation equipment that allows the various wheels of the irrigation system to be precisely oriented relative to the particular distance of location thereof from the central support tower of the irrigation system. This feature effectively causes all of the wheels of the irrigation system, regardless of the relative position thereof, to be precisely adjusted, causing the irrigation system to precisely track circular paths during operation thereof. There will be very little tension force applied by the irrigation system to the centrally located support tower, thereby allowing the support tower to be more lightly and inexpensively constructed without risking damage thereto during irrigation operations. The present invention further allows simple and efficient positioning of the wheels of an irrigation system both in an operative and movement or towing position thereof and effectively allows each of these positions to be precisely adjusted as desired. By utilizing a single adjustment element having multiple adjustment devices such as lock nuts connected thereto, it is not likely that any part of the adjustment structure of the irrigation system will become lost or misplaced as might otherwise occur if the adjustment mechanism incorporated multiple parts that require disassembly before positioning or adjustment of the ground engaging wheels could be accomplished. It is therefore seen that the present invention is one well adapted to attain all of the objects and advantages hereinabove set forth together with other advantages that will become obvious and inherent from a description of the apparatus itself. It will be understood that certain combinations and subcombinations are of utility and may be employed without reference to other features and subcombinations. This is contemplated by and is within the scope of the present invention.

What is claimed is:

1. A mobile base for providing mobile support for irrigation sprinkling apparatus that is rotatable about a fixed point during operation, said mobile base comprising:
    structural means for supporting at least a portion of a mobile sprinkling apparatus;
    at least one ground contacting element being connected to said structural means and, when driven, imparting movement to said structural means and the sprinkling apparatus supported thereby;
    means connected to said ground contacting element for driving said ground contacting element;
    first reference means being defined by said structural means;
    second reference means being defined by said ground contacting element and being in spaced relation to said first reference means;
    a positioning element engaging said first and second reference means;
    first locking means securing one portion of said positioning element to said first reference means; and
    second locking means securing a second portion of said positioning element to said second reference means, at least one of said first and second locking means being adjustable relative to said positioning element to establish an operating position of said ground contacting element relative to said structural means, such that said ground contacting element will track a predetermined arc defined by the distance of said ground contacting element from said fixed point.

2. A mobile base as recited in claim 1, wherein:
    said structural means is defined in part by an elongated structural element; and
    said ground contacting element means being a plurality of ground contacting elements that are pivotally connected to said elongated structural element, at least one of said ground contacting elements being maintained by said positioning element in offset relation to an imaginary line extending from said fixed point through the center of said structural means.

3. A mobile base as recited in claim 1, wherein said mobile base includes:
    third reference means being defined by said structural means;
    said positioning element being securable in engagement with said second and third reference means upon substantially 90° rotation of said ground contacting element relative to said structural means from the operative position thereof to a position allowing substantially linear movement of said irrigation sprinkling apparatus.

4. A mobile base as recited in claim 1, wherein said mobile base includes:
    support means supporting said ground contacting element, said support means being rotatably movable relative to said structural means, said second reference means being defined by said support means;
    third reference means being defined by said structural means; and
    said positioning element being further connectable to said second and third reference means to establish a movement position for said ground contacting element whereby said ground contacting element is rotated substantially 90° from said operating position for allowing substantially linear movement of said irrigation sprinkling apparatus.

5. A mobile base for providing mobile support for irrigation sprinkling apparatus having water supply conduit means that is rotatable about a fixed point during irrigation operations, said mobile base comprising:
    an elongated structural element being disposed in generally transverse relation to said water supply conduit means and providing support for at least a portion of said water supply conduit means;

a pair of support elements being pivotally disposed one at each extremity of said elongated structural element;

ground contacting element means being supported by each of said support elements;

first reference means being defined at each extremity of said elongated structural element;

second reference means being provided on each of said support elements and being in spaced relation with said first reference means;

positioning element means engaging said first and second reference means;

first locking means securing one portion of said positioning element means to said first reference means; and second locking means securing a second portion of said positioning element means to said second reference means, at least one of said first and second locking means being adjustable relative to said positioning element and adjustably establishing the angular relationship of said support elements and said ground contacting elements relative to said elongated structural element to cause arcuate locking of said ground contacting element during irrigation operations.

6. A mobile base as recited in claim 5, wherein said positioning element means comprises:

an elongated restraining device having means for interconnection thereof to both said first reference means and said second reference means, the length of said positioning element being controllably adjustable for securing said support element in a desired position thereof relative to said elongated structural element.

7. A mobile base as recited in claim 5, wherein said positioning element comprises:

an elongated rod that is at least partially threaded;

said first and second locking means being a plurality of lock nuts being received by the threads of said elongated rod, said lock nuts being manipulatable to lock said elongated rod in assembly with said first reference means and with said second reference means; and the position of said lock nuts being manipulatable to establish said desired angular positioning of said support element and thus said ground contacting element relative to said elongated structural element to cause said accurate arcuate tracking of said ground contacting element means during irrigation operations.

8. A mobile base as recited in claim 7, wherein:

a second set of lock nuts is retained by said elongated rod and serves a locking function during securing of said rod to said positioning element and said second reference means.

* * * * *